(12) United States Patent
Kurihara et al.

(10) Patent No.: US 9,497,282 B2
(45) Date of Patent: Nov. 15, 2016

(54) NETWORK CODING FOR CONTENT-CENTRIC NETWORK

(71) Applicant: Palo Alto Research Center Incorporated, Palo Alto, CA (US)

(72) Inventors: Jun Kurihara, Mountain View, CA (US); Ersin Uzun, Campbell, CA (US); Jose J. Garcia-Luna-Aceves, San Mateo, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 111 days.

(21) Appl. No.: 14/470,788

(22) Filed: Aug. 27, 2014

(65) Prior Publication Data

US 2016/0065685 A1 Mar. 3, 2016

(51) Int. Cl.
*H04L 1/18* (2006.01)
*H04L 29/08* (2006.01)
(Continued)

(52) U.S. Cl.
CPC ......... *H04L 67/2823* (2013.01); *H04L 1/0076* (2013.01); *H04L 1/08* (2013.01); *H04L 67/10* (2013.01); *H04L 67/108* (2013.01); *H04L 67/12* (2013.01); *H04L 69/06* (2013.01); *H04L 69/10* (2013.01)

(58) Field of Classification Search
CPC ............... H04L 67/2823; H04L 1/0076; H04L 1/08; H04L 29/08; H04L 67/10
See application file for complete search history.

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Jacobson, Van et al. 'VoCCN: Voice Over Content-Centric Networks.' Dec. 1, 2009. ACM ReArch'09.
(Continued)

*Primary Examiner* — Esaw Abraham
(74) *Attorney, Agent, or Firm* — Shun Yao; Park, Vaughan, Fleming & Dowler LLP

(57) ABSTRACT

One embodiment of the present invention provides a system for facilitating network coding in an information centric network. During operation, the system sends, from a content consumer node, one or more interests for a plurality of chunks associated with a content object. A respective interest indicates the corresponding chunk using a hierarchically structured variable length identifier which comprises contiguous name components ordered from a most general level to a most specific level. In response, the system then receives a number of network-coded data packets, wherein a respective data packet corresponds to an independent linear combination of all the chunks for the content object. The system subsequently re-constructs the content object based on the received data packets.

10 Claims, 7 Drawing Sheets

(51) Int. Cl.
  *H04L 1/00* (2006.01)
  *H04L 1/08* (2006.01)
  *H04L 29/06* (2006.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 * | 12/2009 | Lev-Ran ............... H04L 12/583 709/218 |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,069 B2 * | 9/2010 | Cheung .................. H04L 45/16 370/312 |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 * | 9/2012 | Turner .................. H04L 65/607 370/338 |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 * | 10/2014 | Kozat .................. H04L 12/1881 370/229 |
| 8,862,774 B2 | 10/2014 | Vasseur |
| 8,903,756 B2 | 12/2014 | Zhao |
| 8,937,865 B1 | 1/2015 | Kumar |
| 9,002,921 B2 * | 4/2015 | Westphal ................ H04L 67/06 709/202 |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |

(56) References Cited

U.S. PATENT DOCUMENTS

| | | |
|---|---|---|
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |

(56) References Cited

U.S. PATENT DOCUMENTS

| | | |
|---|---|---|
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network &oldid=465077460.

"Digital Signature" archived on Aug. 31, 2009 at http://web.archive.org/ web/20090831170721/http://en.wikipedia.org/wiki/Digital_signature.

"Introducing JSON," http://www.json.org/.downloaded Mar. 11, 2015.

"Microsoft PlayReady," http://www.microsoft.com/playready/. downloaded Mar. 11, 2015.

"Pursuing a pub/sub internet (Pursuit)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

(56) References Cited

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {2013, Aug.). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peerto-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Science vol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).

(56) References Cited

OTHER PUBLICATIONS

Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

(56) References Cited

OTHER PUBLICATIONS

The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/ content/dam/Adobe/en/devnet/rtmp/ pdf/rtmp specification 1.0.pdf.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

\* cited by examiner

NAME IN CCN: / parc.com / jun.jpg / %00%01
　　　　　　　　　　└─────┬─────┘└──┬──┘
　　　　　　　　　　　　PREFIX　　SEQ. NUM.

NAME IN NC-CCN: / parc.com / jun.jpg / %A0%10 / %00%03 / %A1%00 / %A2%03
　　　　　　　　　└─────┬─────┘└──┬──┘└──┬──┘└──┬──┘└──┬──┘
　　　　　　　　　　　PREFIX　　NC FLAG　SEQ.　RETRY　SEEN
　　　　　　　　　　　　　　　WITH GROUP NUM.　FLAG　INFO
　　　　　　　　　　　　　　　　SIZE

FIG. 3B

NETWORK CODING FOR CONTENT-CENTRIC NETWORK

RELATED APPLICATIONS

The subject matter of this application is related to the subject matter in the following U.S. Pat. No. 8,243,735, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed on 15 Dec. 2009; U.S. Pat. No. 8,160,069, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009; and U.S. Pat. No. 8,204,060, entitled "METHOD AND SYSTEM FOR FACILITATING FORWARDING A PACKET IN A CONTENT-CENTRIC NETWORK", by inventors Van L. Jacobson and James D. Thornton, filed on 17 Dec. 2009; the disclosures of which herein are incorporated by reference in their entirety.

BACKGROUND

Field

The present disclosure relates generally to facilitating data processing in network. More specifically, the present disclosure relates to a system and method for facilitating network coding in content-centric networks.

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively more inadequate for meeting the ever-changing network demands.

Recently, content-centric network (CCN) architectures have been proposed in the industry. CCN brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, content objects and interests are identified by their names, which is typically a hierarchically structured variable-length identifier (HSVLI). When an interest in a piece of content is received at a CCN node, a local content cache is checked to see if the content being requested exists. In certain situations, however, transporting data through a number of CCN nodes and links can be inefficient when multiple copies of an interest are sent out.

SUMMARY

One embodiment of the present invention provides a system for facilitating network coding in an information centric network. During operation, the system sends, from a content consumer node, one or more interests for a plurality of chunks associated with a content object. A respective interest indicates the corresponding chunk using a hierarchically structured variable length identifier which comprises contiguous name components ordered from a most general level to a most specific level. In response, the system then receives a number of network-coded data packets, wherein a respective data packet corresponds to an independent linear combination of all the chunks for the content object. The system subsequently re-constructs the content object based on the received data packets.

In a variation on this embodiment, re-constructing the content object based on the received data packets involves determining that at least one more data packet is needed for re-constructing a missing chunk and sending a retry interest which indicates the missing chunk.

In a variation on this embodiment, the hierarchically structured variable length identifier includes a component which indicates use of network coding and a number of chunks for the content object.

In a variation on this embodiment, the hierarchically structured variable length identifier includes a component which indicates whether the corresponding interest is a retry interest.

In a variation on this embodiment, the hierarchically structured variable length identifier includes a component which indicates one or more chunks that have already been re-constructed.

One embodiment of the present invention provides a system for facilitating network coding at a switching node in an information centric network. During operation, the system receives an interest generated by a content consumer node for a chunk associated with a content object. In response to the chunk being locally available and not having been sent previously to a node from which the interest is received, the system sends an independent linear combination of the chunk and one or more other chunks associated with the content object to the node from which the interest is received. In response to the chunk not being locally available, the system forwards the interest and subsequently caching an independent linear combination of the chunk and other chunks for the content object when such combination is received in response of the forwarded interest.

In a variation on this embodiment, the system receives a linear combination of a plurality of chunks for the content object from another node. The system then determines that the received linear combination of chunks is not independent from a locally cached linear combination of chunks and discards the received linear combination of chunks.

In a variation on this embodiment, subsequent to sending the independent linear combination of the chunks, the system indicates that the chunk has been sent to the node from which the interest is received.

In a variation on this embodiment, the system determines a received interest is a detour interest and, in response, discards the detour interest

BRIEF DESCRIPTION OF THE FIGURES

FIG. 3B illustrates exemplary name components in accordance with an embodiment of the present invention.

In the figures, like reference numerals refer to the same figure elements.

DETAILED DESCRIPTION

Figure 1:
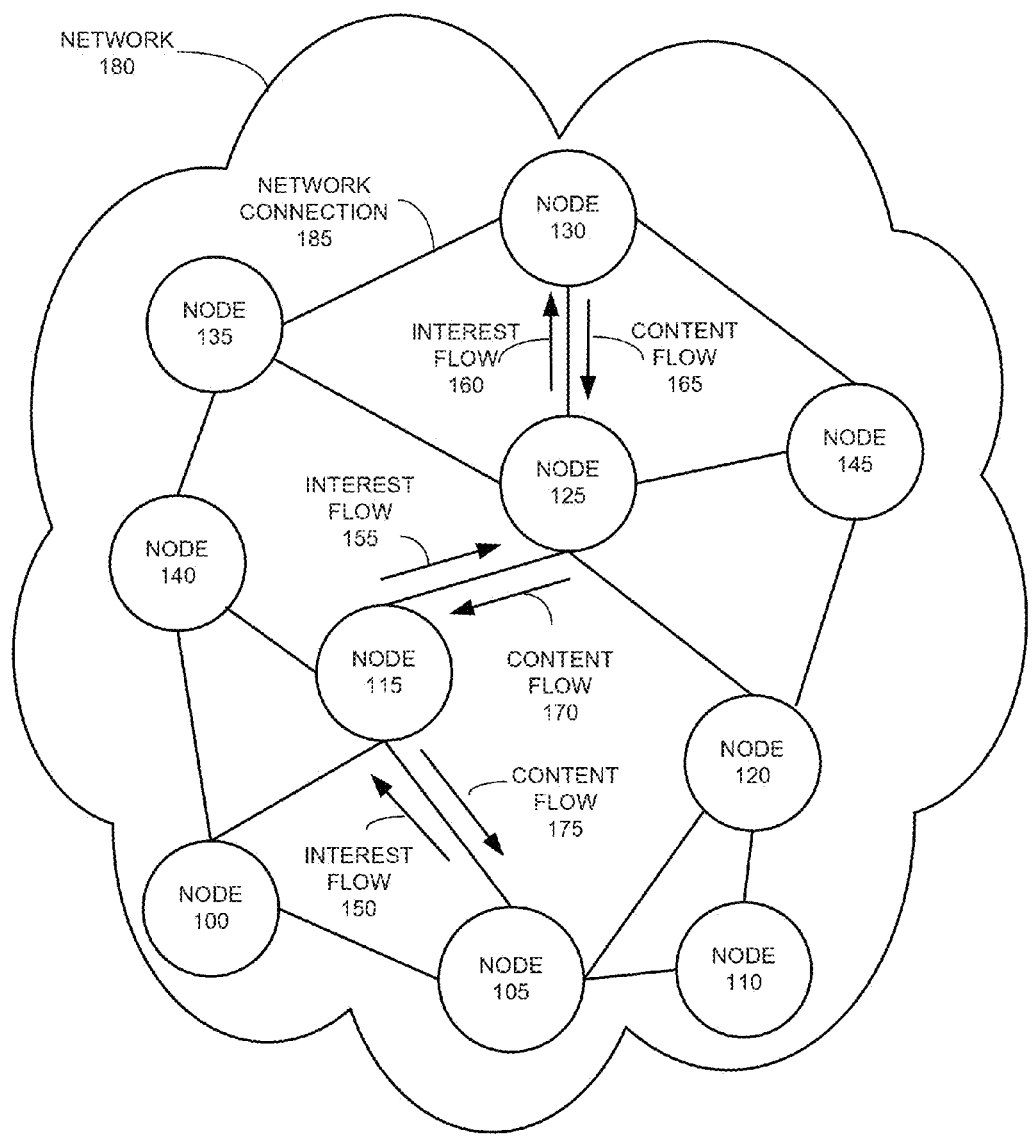
FIG. 1 illustrates an exemplary architecture of a network, in accordance with an embodiment of the present invention.

Several information centric networking (ICN) architectures have been proposed to date as alternatives to the existing Internet architecture to enable efficient access to content and services by name, independently of their locations. Meanwhile, network coding (NC) has been shown to improve the throughput of information dissemination in networks subject to multi-point communication or connectivity disruption. This is attained by encoding data packets in a way that sources and relays can transmit (component-wise) linear combinations of the data packets, rather than the individual data packets themselves, such that any relay or intended receiver is able to decode the data packets as long as it receives sufficient independent linear combinations of the data packets.

NC can increase the overall performance of ICN in terms of information dissemination. Few proposals, however, have been advanced to date on the integration of NC and ICN. Furthermore, it is usually assumed that all routers support NC.

Embodiments of the present invention facilitate network-coded content centric networking (NCCN) as an example of how NC can be integrated with ICN approaches seamlessly in order to improve the performance of an ICN without requiring all routers to implement NC. NCCN allows Interests and data packets to be processed by normal CCN or named data networking (NDN) nodes without NC capability as normal CCN or NDN packets. To realize this compatibility, NCCN introduces new Name components that represent information required for the use of NC, without any change to the structures of Interest and Data packets. The protocol stack of NCCN is designed with minimal changes to normal CCN or NDN stack. NCCN only adds additional steps prior to the basic forwarding and caching strategies of CCN or NDN to enable the use of NC. This implies that existing forwarding strategies and caching strategies designed for CCN or NDN can be used without modification in NCCN.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple interests for the same name, it may aggregate those interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. There is not a host or query string. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an interest in "/parc/home/bob" will match both "/parc/home/bob/test.txt" and "/parc/home/bob/bar.txt." The longest match, in terms of the number of name components, is considered the best because it is the most specific.

"Interest:" A request for a Content Object. The Interest specifies an HSVLI name prefix and other optional selectors that can be used to choose among multiple objects with the same name prefix. Any Content Object whose name matches the Interest name prefix and selectors satisfies the Interest.

"Content Object:" A data object sent in response to an Interest. It has an HSVLI name and a Contents payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interest or originate content.

In accordance with an embodiment of the present invention, a consumer can generate an Interest in a piece of content and then send that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (interest flow 150) to node 115, which does not have the content available. Next, the Interest flows (interest flow 155) from node 115 to node 125, which again does not have the content. The Interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

We first introduce definitions and notation that will be used in the description of NCCN. Let $F_q$ be a finite field of order q and $F_q^m$ (m>0) be an m-dimensional vector space over $F_q$. Consider that a Content Object is split into multiple chunks $k_1, k_2, \ldots,$ of equal size. We treat each chunk as an element of a finite field $F_q$, or a vector in $F_q^m$ (m>0). For instance, each chunk is regarded as a 1024-dimensional vector over $F_{2^8}$ when the size of each chunk is 1024 bytes. We assume the use of groups of content chunks with fixed size n, and assume that intersections between any two groups are empty. We also assume that each group has a unique identifier or number.

Figure 2:
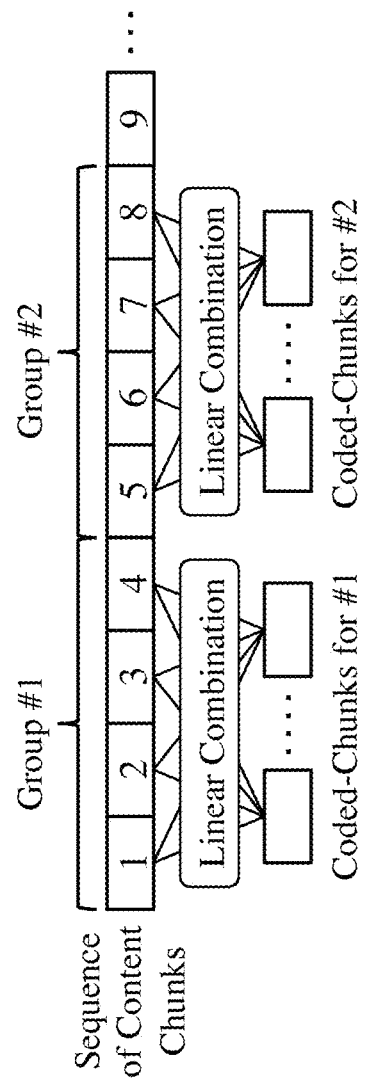
FIG. 2 shows an exemplary chunking for a Content Object, in accordance with an embodiment of the present invention.

FIG. 2 shows an exemplary chunking for a Content Object, where n=4. Each group in the figure has the number #1, #2, . . . . For each group we define coded-chunks as linear combinations of content chunks in that group. Suppose that a network node has t coded-chunks $y_1, \ldots, y_t \in F_q^m$ of a group $(k_1, \ldots, k_n)$ in its cache, and that they are represented as $[y_1, \ldots, y_t]^T = A[k_1, \ldots, k_n]^T$, where $A=[\alpha_{i,j}]_{i=1,j=1}^{t,n} \in F_q^{t \times n}$ and $\cdot^T$ denotes the transpose. Since $$y_i = \sum_{j=1}^{n} \alpha_{i,j} k_j$$

holds, the vector $[\alpha_{i,1}, \ldots, \alpha_{i,n}] \in F_q^n$ is called the coefficient vector of $y_i$. We say that a coded-chunk is linearly independent from another coded-chunk if their coefficient vectors are linearly independent. Let $V_A \subseteq F_q^n$ be a linear subspace spanned by row vectors, i.e., coefficient vectors, of A. We then introduce the definition of seen and unseen chunks: A chunk $k_i$ is said to be seen if a vector of the form $[0, \ldots, 0, 1, \beta_{i+1}, \beta_{i+2}, \ldots, \beta_n] \in F_q^n$ belongs to $V_A$. Otherwise, it is said to be unseen.

We note that the number of seen chunks at the node equals $\dim V_A$. The information of chunks from a given group that are seen at a node is represented by an n-dimensional binary vector. For example, in the case where n=4 and the first and second chunks in a group are seen, the information of the seen or unseen chunks in the group is given by $[1,1,0,0] \in F_2^4$.

A key design goal in NCCN is to attain compatibility with the normal CCN or NDN architecture in such a way that incremental deployment from CCN or NDN to NCCN is possible. This means that, even if some intermediate nodes in the network are normal CCN or NDN nodes that do not support NCCN, they can process NCCN Interest and data packets as normal CCN or NDN packets, but the producer and consumer can still communicate using network coding. Conversely, NCCN nodes can serve Interest and data packets of normal CCN or NDN traffic with producers and consumers communicating without using network coding.

Figure 3A:
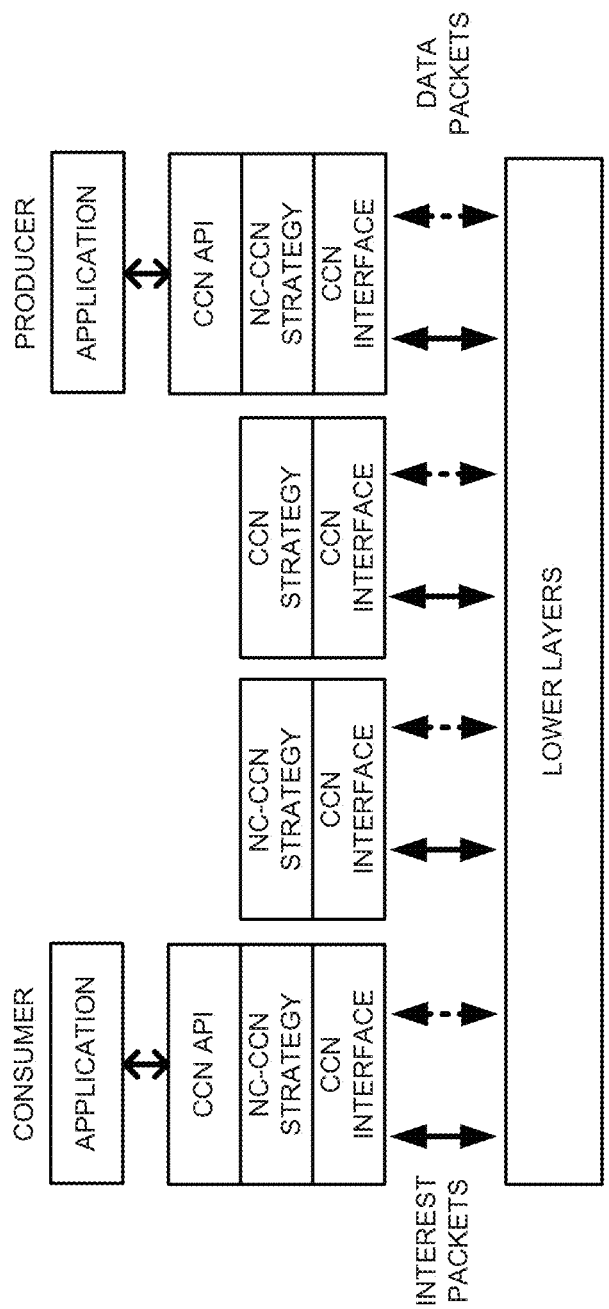
FIG. 3A presents a block diagram illustrating an exemplary network protocol stack, in accordance with an embodiment of the present invention.

FIG. 3A illustrates the intended compatibility between NCCN and CCN or NDN. The NCCN protocol stack has the same interfaces to lower layers and the same application programming interfaces (API) as normal CCN or NDN nodes. In addition, the NCCN strategy layer must be able to forward and cache packets in such a way that minimal changes are needed from that of the normal CCN or NDN protocol stack. On the other hand, whenever network coding is used, encoded content must be decoded to guarantee the availability of the original (non-encoded) content. In CCN or NDN, data packets are cached opportunistically by forwarding nodes and used repeatedly to answer Interests referring to the same content. The second key design goal in NCCN is for it to allow the dissemination of encoded content chunks over the network by having the consumers of content decode the original content.

The design of NCCN involves the way in which content is named, forwarded, and cached in order to take full advantage of network coding (NC) in the context of CCN and NDN.

To attain maximum compatibility between CCN, NDN, and NCCN, new name components are defined in NCCN that allow NCCN routers to process Interest packets and data packets taking advantage of NC, while CCN or NDN routers can process such packets without NC. The packet formats of Interest and data packets in NCCN are the same as those in CCN.

The approach adopted in NCCN for the dissemination and caching of encoded content chunks implements a table of sent-flags at each NCCN node. The table of sent-flags at a node shows that each content chunk is regarded as 'seen' or 'unseen' to its downstream nodes. By referring to the sent-flags, each NCCN node controls how to forward or cache incoming packets prior to executing the basic strategy of CCN or NDN. Using this control method based on sent-flags, NCCN nodes can disseminate encoded content chunks over the network while maintaining the decodability at the consumers.

FIG. 3B illustrates the three new name components introduced in NCCN to enable the use of NC, in accordance with one embodiment of the present invention. In this FIG. 3B, 'Name in CCN/NDN' represents an example of the name for a chunk with sequence number 0x03 in CCN/NDN, and 'Name in NCCN' represents the same chunk encoded with other chunks in the group using the NC operations. As shown in this example, we introduce three name components:

Network coding flag (NC flag) with the group size.
Retry flag.
"Seen" information at the consumer.

The markers, e.g., the prefix %00 of the sequence number in FIG. 3B, are control characters in the CCN or NDN architecture. Generally, control characters in a Name indicate additional information of the content chunks, such as version number or sequence number. We introduce three new markers to add three new Name components.

The NC flag is indicated by the marker % A0 in FIG. 3B, and the value following the marker represents the group size. For example, when an Interest has the Name of NCCN in FIG. 3B, it is a request for a coded-chunk in a group of size 0x10=16, where the group includes the chunk with sequence number 0x03. The group can be uniquely determined by the sequence number that originally exists and the group size. Note that by virtue of the NC flag, incoming Interest/data packets to the intermediate node can be recognized as the NCCN packets or as the CCN/NDN packets.

The retry flag is indicated by the marker % A1 in FIG. 3B. The value following the marker is 0x00 (false) or 0x01 (true). If an Interest has a Name including % A1%01, it is a special Interest called a retry-Interest for a particular chunk. Otherwise, it is just a normal Interest for a coded-chunk.

When a consumer transmits an Interest for a coded chunk, the information of chunks in the group that have been seen by the consumer is appended to the name. The information of chunks in a given group G seen by the consumer is called the "seen information" of G and is represented by an n-dimensional binary vector, $v_{seen,G} \in F_2^n$. In FIG. 3B, the seen information is indicated by the marker % A2. The value following the marker is the hexadecimal value representing $v_{seen,G}$. For example, when n=4 and $v_{seen,G}=[1,1,0,0]$, the seen information value is $(0011)_2=0x03$.

These new naming components are used to control the behavior of intermediate NCCN nodes and to maintain compatibility with normal CCN or NDN nodes. Although NCCN adds three new name components, it does not change the rest of the CCN or NDN Interest packet format. Coded chunks and the information needed to execute network coding operations are included in the payload field of the CCN or NDN data packet format. Given that the name components introduced in NCCN are regarded just as parts of the name in CCN and NDN, the interfaces of NCCN nodes remain unchanged from those of CCN or NDN nodes, and normal CCN or NDN nodes can serve Interest and data packets of NCCN packets as normal CCN or NDN packets.

The handling of Interest packets in NCCN is similar to that of normal CCN or NDN. When a node receives an Interest for a coded-chunk, the node generates a data packet including a new coded-chunk from cached data packets (if available) and sends it as the response to the Interest if some conditions are satisfied. Otherwise, as normal CCN or NDN, the node adds the Interest to the pending Interest table (PIT), and if the Interest has not been forwarded within a fixed time period, the node also forwards the Interest over some faces by referring to the PIT and the forwarding information base (FIB) according to the basic forwarding strategy.

In NCCN, every data packet includes a coded-chunk and its coefficient vector in the payload field of the data packet format of CCN or NDN.

Algorithm 1 below describes the caching algorithm of NCCN, which essentially works over the basic caching strategy of normal CCN or NDN. As shown in Algorithm 1, the additional step with respect to CCN and NDN is that, when the coded-chunk of received data Y in group G does not increase the degree of freedom (i.e., it does not expand the subspace spanned by coefficient vectors of cached coded-chunks for G), the node does not cache the data packet and discards it.

Algorithm 1:

Caching arrived data Y including a coded-chunk y in group G with coefficient vector v at the node that has t coded-chunks $y_1, \ldots, y_t \in F_q^m$ with coefficient vectors $v_1, \ldots, v_t \in F_q^n$ for G in its cache:

```
V ⊆ F_q^n ← subspace spanned by v_1, . . . , v_t
if v ∈ V then
    Discard Y
    return
end if
```

Cache Y According to the Basic Strategy

Every NCCN node has a table of sent-flags for each group G that is represented by an n-dimensional binary vector $v_{sent,G} \in F_2^n$, where the initial value of the vector is 0. The purposes of sent-flags are to manage which chunks are seen or unseen by downstream nodes, and to decide if the node should respond to an Interest by using coded-chunks in its cache. If the sent-flag corresponding to a chunk k in G (an element of $v_{sent,G}$) is 1, it indicates that the node has already generated a coded-chunk and has sent out a Data with the Name of k. Then, we assume k as the one that is already seen by downstream nodes. Also, if the number of cached coded-chunks in group G is smaller than the Hamming weight of $v_{sent,G}$, we assume that there exist some chunks in G that can newly become seen by downstream nodes by generating and sending out coded-chunks from the node.

Algorithm 2 describes the procedure used to respond to an Interest received by an NCCN node or the one pending in its PIT. When a Data packet in a group G arrives and it can be cached by Algorithm 1, the node checks all Interests for coded-chunks in G stored in its PIT by Algorithm 2, and tries to respond to one of them.

Algorithm 2:

Responding to an Interest for a chunk k in group G at a node that has t coded-chunks in G with sent-flags $v_{sent,G} \in F_2^n$ in its cache:

```
flag ← the component of v_sent,G that corresponds to k
wt (v_sent,G) ← the Hamming weight of v_sent,G
if flag ≠ 1 then
    if wt (v_sent,G) < t and k is unseen in the cache then
        return
    end if
    1 → the component of v_sent,G that corresponds to k
end if
```

Generate a Data Packet Y by Algorithm 3
Respond to the Interest

Algorithm 3:

Generating a data packet Y as a response to a (pending) Interest X in group G at the node that has t coded-chunks $y_1, \ldots, y_t \in F_q^m$ for G:

repeat
Randomly choose $a_1, \ldots, a_t \in F_q$
until $(a_1, \ldots, a_t) \neq 0$ $$v \leftarrow \sum_{i=1}^{t} a_i v_i$$

-continued $$y \leftarrow \sum_{i=1}^{t} a_i y_i$$

Generate Y Including y and v with the Name of X

As shown in Algorithm 2, each NCCN node responds to an Interest for a chunk only if the chunk 'is already seen' or 'can be seen' by downstream nodes. This avoids the unnecessary transmission of coded-chunks that do not expand the subspace spanned by coefficient vectors of coded-chunks cached in each downstream node.

When a node decides to respond to an Interest and generate a data packet, it employs random network coding following the process described in Algorithm 3.

According to Algorithm 3, a node generates a random linear combination of cached coded-chunks for G, and sends it as the response to the (pending) Interest. Then, if the PIT entry has multiple outgoing faces, the coded-chunk sent through each outgoing face should be different and hence Algorithm 3 needs to be executed for each face.

When an NCCN node receives an Interest for a coded-chunk in group G, the node first updates $v_{sent,G}$ before executing Algorithm 2. Let $\dim_G$ denote the number of cached coded-chunks for G. $\dim_G$ equals the dimension of the subspace spanned by the coefficient vectors of the cached coded-chunks, and $wt(v_{sent,G}) \leq \dim G$ always holds in our construction, where wt is the Hamming weight. By $v_{seen,G}$ obtained from the name of the arrived Interest, let $u_G$ be $$u_G = \min\{\dim_G - wt(v_{sent,G}), wt(v_{seen,G} \oplus v_{sent,G}) \& v_{seen,G})\},$$

where "$\oplus$" and "&" are the component-wise exclusive- or operation and the 'and' operation, respectively. Then, $u_G$ elements of zeros in $v_{sent,G}$ are turned to 1's. For example, if $\dim_G = 3$, $v_{sent,G} = [1,1,0,0]$ and $v_{seen,G}[1,0,1,0]$, $v_{sent,G}$ is updated to [1,1,1,0]. By updating the sent-flags, NCCN nodes can manage the status of data packets received by consumers. The ability of decode content chunks is ensured by executing this update algorithm prior to Algorithm 2.

Using random network coding in NCCN, a consumer of content is able to reconstruct it as long as enough coded-chunks are delivered to reconstruct each group, i.e., n linearly independent coded-chunks for each group with high probability if the size of $F_q$ is large.

The dissemination techniques based on sent-flags support the dissemination of linearly independent coded-chunks over the network. However, the consumer might obtain fewer than n linearly independent coded-chunks needed to decode a piece of content, and coefficient vectors of all coded-chunks cached in all the nodes other than the producer might not span the space of dimension n. Then, some chunks in a group cannot be seen within a fixed time period and the requests for such chunks time out. To address this case and allow the content chunks to be decoded, NCCN uses a special Interest called the retry-Interest. The retry-Interest is indicated by the marker in the Name as explained previously. The consumer is allowed to transmit a retry-Interest for a chunk when the chunk has not been seen and the previous pending interest timed out.

When an NCCN node receives the retry-Interest for a chunk in group G, it processes the retry-Interest as a normal Interest if the node has n coded-chunks for G in its cache. In the case where the node has fewer than n coded-chunks, the node changes the sent-flag for the chunk to 0 and forwards the retry-Interest to upstream nodes according to the basic CCN or NDN forwarding strategy. The role of the retry-Interest for a chunk is to restart the encoding and transmission for the chunk over the network.

Figure 4:
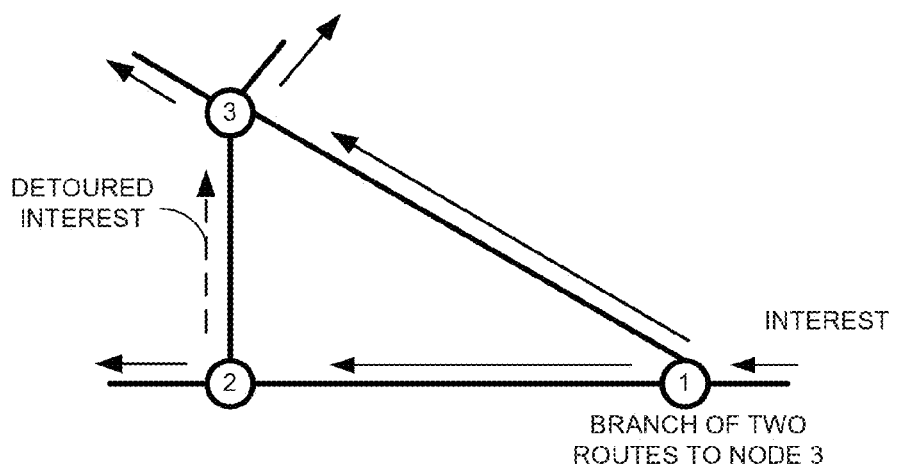
FIG. 4 presents a diagram illustrating an exemplary detour Interest, in accordance with an embodiment of the present invention.

As previously explained, NCCN assumes the use of multi-face forwarding strategies supported in the native CCN or NDN architecture. Considering multi-face forwarding strategies, we can introduce an additional step prior to the procedure to add the received Interest to the PIT of a node. When NCCN or normal CCN or NDN nodes in the network uses a strategy of forwarding to multiple faces, there could exist a 'detour' of Interests to a node as illustrated in FIG. 4. In order to benefit from network coding, although distinct multiple paths from the consumer to producer should be provided, the detour of Interests illustrated in FIG. 4 is unnecessary. In this example, the Interest coming from node 2 to node 3 is regarded as the detoured one. In fact, responses to such detoured Interests consume unnecessary network bandwidth and computational resources in NCCN. Thus, such unnecessary detoured Interests should not be added to PITs.

Algorithm 4 presents the additional step used to discard detoured Interests. Intermediate nodes omit and discard detoured Interests based on the arrival time or hop counts of received Interests. In particular, if the difference between the hop count from the (unique) consumer node or the arrival time of a detoured Interest and that of the same Interest stored in PIT is greater than threshold $t_{detour}$, the detoured Interest is discarded. The hop count is usually included in Interest packets, and the arrived time is obvious from the life time of PIT entries.

Algorithm 4:

Discarding detoured Interests $X_d$ that has the nonce at nodes with multi-face forwarding:

```
h_d ← hop count (arrived time) of X_d
Check if ∃ Interest X_p with nonce in PIT
if X_p ≠ NULL then
    h_p ← hop count (arrived time) of X_p
    if h_d - h_p > t_detour then
        Discard X_d
        return
    end if
end if
```

Process $X_d$ According to the Basic Strategy

Figure 5:
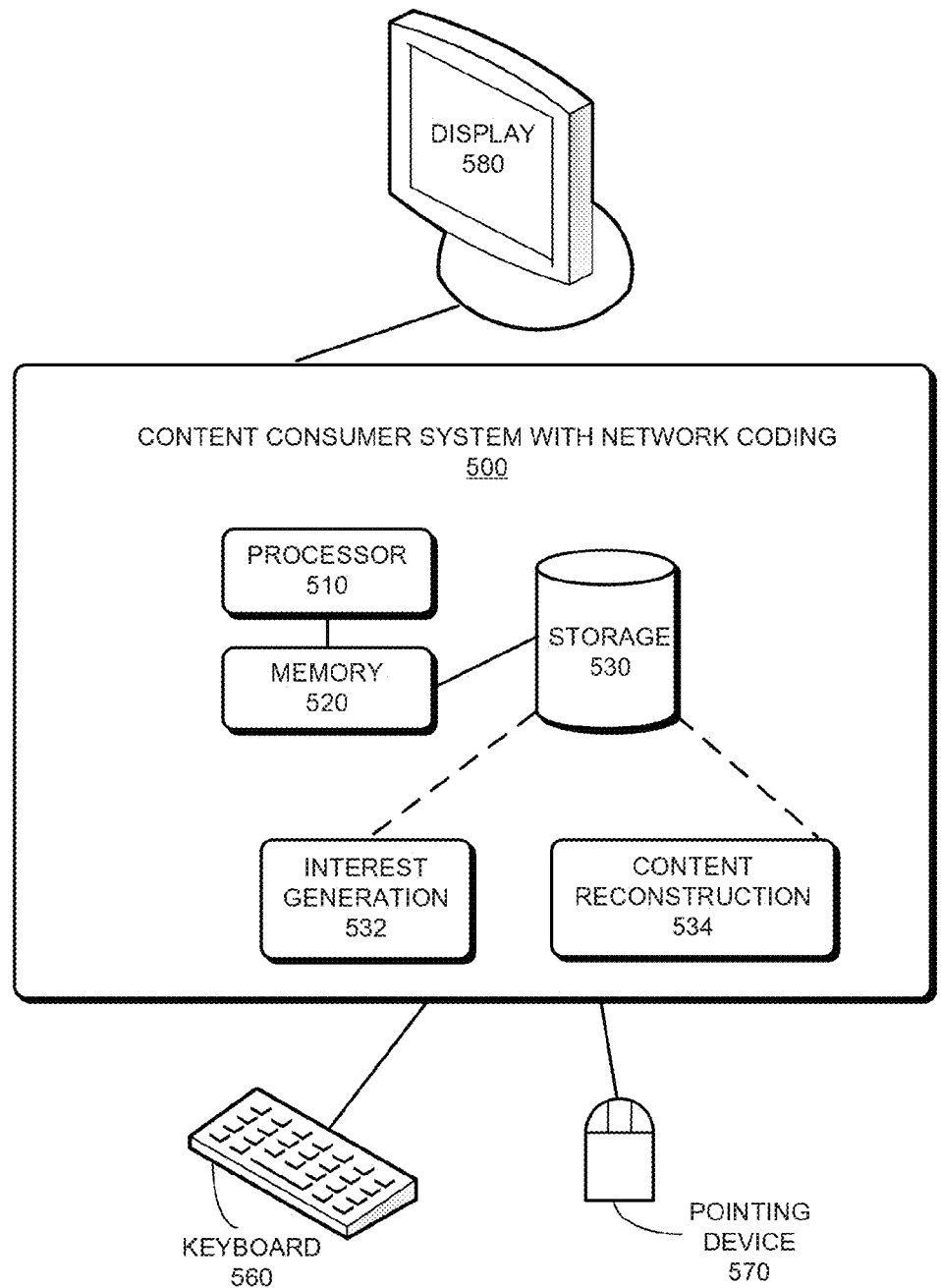
FIG. 5 illustrates an exemplary content-consumer system with network coding, in accordance with an embodiment of the present invention.

FIG. 5 illustrates an exemplary content-consumer system that facilitates network coding, in accordance with an embodiment. A content-consumer system 500 with network coding capabilities comprises a processor 510, a memory 520, and a storage 530. Storage 530 typically stores instructions which can be loaded into memory 520 and executed by processor 510 to perform the methods mentioned above. In one embodiment, the instructions in storage 530 can implement an interest generation module 532 and a content reconstruction module 534, which can be in communication with each other through various means. In one embodiment, content consumer system 500 is coupled to a display 580, a keyboard 560, and a pointing device 570.

During operation, interest generation module 532 generates interests corresponding to the chunks of a content object. Content reconstruction module 534 the re-constructs the content object using received linear combinations of the chunks, as described above.

Figure 6:
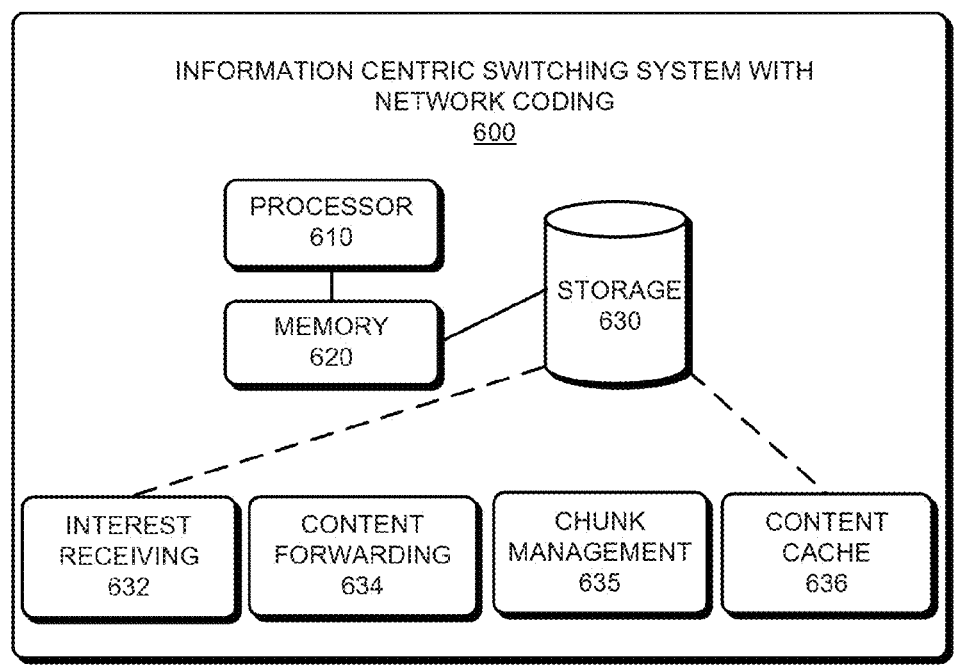
FIG. 6 illustrates an exemplary switching system with network coding, in accordance with an embodiment of the present invention.

FIG. 6 illustrates an exemplary switching system that facilitates network coding, in accordance with one embodiment of the present invention. In this example, an information centric switching system 600 with network coding capabilities comprises a processor 610, a memory 620, and a storage 630. Storage 630 typically stores instructions which can be loaded into memory 620 and executed by processor 610 to perform the methods mentioned above. In one embodiment, the instructions in storage 630 can implement an interest receiving module 632, a network coded content forwarding module 634, a chunk management module 635, and a content cache 636.

During operation, interest receiving module 632 receive interests corresponding to the chunks of a content object. Content forwarding module 634 then constructs independent linear combinations of chunks stored in content cache 536 in response to received interests. Chunk management module 635 maintains records on which linear combinations have been previously sent to requesting nodes, and also manages which linear combinations are to be cached locally.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for facilitating network coding in an information centric network, the method comprising:
sending, from a content consumer node, one or more interests for a plurality of chunks associated with a content object, wherein a respective interest indicates the corresponding chunk using a hierarchically structured variable length identifier which comprises contiguous name components ordered from a most general level to a most specific level,
wherein the identifier includes a name component which indicates whether the corresponding interest is a retry interest;
in response, receiving a number of network-coded data packets, wherein a respective data packet corresponds to an independent linear combination of all the chunks for the content object; and
re-constructing the content object based on the received data packets, which involves:
determining that at least one more data packet is needed for re-constructing a missing chunk; and
sending a first retry interest which indicates the missing chunk.

2. The method of claim 1, wherein sending the first retry interest is in response to determining that the corresponding missing chunk has not been seen by the content consumer node and that a previous pending interest for the corresponding missing chunk has timed out.

3. The method of claim 1, wherein the hierarchically structured variable length identifier includes a component which indicates use of network coding and a number of chunks for the content object.

4. The method of claim 1, wherein a name for the first retry interest includes a name component which indicates that the corresponding interest is a retry interest.

5. The method of claim 1, wherein the hierarchically structured variable length identifier includes a component which indicates one or more chunks that have already been re-constructed.

6. A computer system for facilitating network coding in an information centric network, the computer system comprising:
a processor; and
a storage device storing instructions that when executed by the processor cause the processor to perform a method, the method comprising:
sending, from a content consumer node, one or more interests for a plurality of chunks associated with a content object, wherein a respective interest indicates the corresponding chunk using a hierarchically structured variable length identifier which comprises contiguous name components ordered from a most general level to a most specific level,
wherein the identifier includes a name component which indicates whether the corresponding interest is a retry interest; and
in response, receiving a number of network-coded data packets, wherein a respective data packet corresponds to an independent linear combination of all the chunks for the content object; and
re-constructing the content object based on the received data packets, which involves:
determining that at least one more data packet is needed for re-constructing a missing chunk; and
sending a first retry interest which indicates the missing chunk.

7. The computer system of claim 6, wherein sending the first retry interest is in response to determining that the corresponding missing chunk has not been seen by the content consumer node and that a previous pending interest for the corresponding missing chunk has timed out.

8. The computer system of claim 6, wherein the hierarchically structured variable length identifier includes a component which indicates use of network coding and a number of chunks for the content object.

9. The computer system of claim 6, wherein a name for the first retry interest includes a name component which indicates that the corresponding interest is a retry interest.

10. The computer system of claim 6, wherein the hierarchically structured variable length identifier includes a component which indicates one or more chunks that have already been re-constructed.

\* \* \* \* \*